US008223196B2

(12) United States Patent
Carter et al.

(10) Patent No.: US 8,223,196 B2
(45) Date of Patent: Jul. 17, 2012

(54) PROJECTOR SYSTEMS AND METHODS FOR PRODUCING DIGITALLY AUGMENTED, INTERACTIVE CAKES AND OTHER FOOD PRODUCTS

(75) Inventors: Charita Y. Carter, Los Angeles, CA (US); Mark Raymond Mine, Canyon Country, CA (US); Modupe Adeleye, Pasadena, CA (US); Christopher Raynard Runco, Burbank, CA (US); Thomas Fraiser Laduke, Orange, CA (US); Bei Yang, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 460 days.

(21) Appl. No.: 12/481,735

(22) Filed: Jun. 10, 2009

(65) Prior Publication Data

US 2010/0315491 A1    Dec. 16, 2010

(51) Int. Cl.
*H04N 13/04* (2006.01)
*H04N 7/18* (2006.01)
(52) U.S. Cl. .......................................... 348/51; 348/61
(58) Field of Classification Search .................. 348/51, 348/61, 744, 739, 789
See application file for complete search history.

(56) References Cited

U.S. PATENT DOCUMENTS

| | | | |
|---|---|---|---|
| 4,416,075 A | 11/1983 | Bauer | |
| 4,910,661 A | 3/1990 | Barth et al. | |
| 4,953,971 A | 9/1990 | Highfill | |
| 5,505,775 A * | 4/1996 | Kitos | 118/14 |
| 5,600,330 A | 2/1997 | Blood | |
| 5,616,078 A | 4/1997 | Oh | |
| 5,736,975 A | 4/1998 | Lunetta | |
| 5,753,931 A | 5/1998 | Borchers | |
| 6,334,684 B1 * | 1/2002 | Yoshida et al. | 353/28 |
| 6,353,428 B1 | 3/2002 | Maggioni et al. | |
| 6,359,612 B1 | 3/2002 | Peter | |
| 6,522,312 B2 | 2/2003 | Ohshima et al. | |
| 7,006,952 B1 | 2/2006 | Matsumoto et al. | |
| 7,259,747 B2 | 8/2007 | Bell | |
| 7,447,558 B2 | 11/2008 | Pratt | |
| 2001/0012001 A1 | 8/2001 | Rekimoto | |
| 2001/0022861 A1 | 9/2001 | Hiramatsu | |
| 2002/0186221 A1 * | 12/2002 | Bell | 345/474 |
| 2004/0037462 A1 | 2/2004 | Lewis | |
| 2004/0102247 A1 | 5/2004 | Smoot et al. | |
| 2005/0168448 A1 | 8/2005 | Simpson | |
| 2006/0072076 A1 | 4/2006 | Smoot et al. | |
| 2006/0075356 A1 * | 4/2006 | Faulkner et al. | 715/782 |
| 2009/0091711 A1 * | 4/2009 | Rivera | 353/28 |

* cited by examiner

*Primary Examiner* — Nhon Diep
*Assistant Examiner* — On S Mung
(74) *Attorney, Agent, or Firm* — Marsh Fischmann & Breyfogle LLP; Kent A. Lembke

(57) ABSTRACT

A method for digitally augmenting or enhancing a food product such as the surface or top of a cake or other edible object. The method includes generating an augmentation media file based on a projection surface of the food product such as a digital movie or image that is mapped to the 3D topography of projection surface and that is projected on the food product using a properly aligned projector. Interactivity is provided by having the method include determining a modification or change of the 3D topography of the projection surface and, based upon the modification, generating a modified augmentation media file and operating the projector to use the modified augmentation media file to project a modified projected image on the food product. The method further provides interactivity by detecting a user interaction with the projection surface and generating a modified augmentation media file based on this tracked interaction.

16 Claims, 11 Drawing Sheets

PROJECTOR SYSTEMS AND METHODS FOR PRODUCING DIGITALLY AUGMENTED, INTERACTIVE CAKES AND OTHER FOOD PRODUCTS

BACKGROUND OF THE INVENTION

1. Field of the Invention

The present invention relates, in general, to projection methods and systems, and, more particularly, to systems, devices, and methods augmenting a food product such as a cake with projected media such as video images that promote storytelling and/or interactivity with the food product.

2. Relevant Background

There are many occasions and events for which it is desirable to create a unique and personalized food product. For example, a birthday is often celebrated in part by decorating a cake in a personalized way suited to an individual such as to include their name and ornamentations matching their hobbies and interests or otherwise creating a unique experience. Ornamentation of various food products, such as cakes, confections, bread loaves, cookies, and various other pastries is often carried out for the celebration of birthdays, holidays, and various festive or similar occasions such as parties. In another well-known example, wedding cakes are sometimes very elaborately ornamented by various elaborate decorations such as candles, a bride and groom figurine, and the like and also with very elaborate levels, shapes, and frosting designs. Another example of a decorative food product is the chocolate fountain in which guests can dip fruit, cake, marshmallows, and other food items to provide a fun and interactive experience.

More recently, there has been a demand for creating customized and personalized decoration of cakes and other food products to create a more unique party event. Generally, typical cake or food product decorating accessories, including those providing electrical illumination, are characterized by structure that extends over or under a cake and that holds candles or light bulbs that project around or above the cake surface. To date, it has been difficult to customize or personalize these decorating accessories to be specific to a person celebrating their birthday or other event or to a couple celebrating their wedding. Customization has often been limited to a particular frosting design such as to include a message such as "Happy Birthday, Amanda" or arranging characters or numbers provided in decoration packages such as to provide a person's age. Each of these techniques is limited in the type of message that can be provided, and the decoration is static, e.g., does not change and is not interactive. Other decoration techniques have included applying an image onto the frosting of the cake similar to printing a still image on a T-shirt, but, again, this is a static decoration with limited appeal.

At some events, such as birthday parties, attendees are able to decorate or customize their cakes using special pans, decorating tools, and decorations/ornaments, and, while the decorating experience may be enjoyable, the resulting cake is still only decorated with static items and may not be unique to the celebrants (e.g., decorated with characters from a movie that would be similar for any other child). As a result, companies that host parties and decoration manufacturers are continuing to search for ways to customize a party to the attendees or a particular celebrant (such as a child on their birthday, a couple on their wedding day, and so on), and, particularly, for ways to provide food products such as cakes that are customized and unique for the celebrant or for a particular party. In some settings, it is also desirable for the food product to be decorated or include ornamentation that is dynamic and entertaining such that the food product or cake provides a portion of the entertainment for the event or that enhances the memories of the event for all that attend.

SUMMARY OF THE INVENTION

The present invention addresses the above and other problems by providing methods and systems for enhancing or augmenting food products such as cakes by using a projector to project images that are mapped to the surfaces of the particular food product. For example, an augmentation media file may be created that maps a movie, which blends a storytelling frame or overlay with person's or celebrant's personal still image or movie clips, onto a three-dimensional (3D) projection surface provided by the surfaces of a cake exposed to and aligned with a digital projector. In some cases, the celebrant is able to select or provide their images to be included in the movie as well as selecting the storytelling portion.

In other embodiments, interactivity is supported with the augmented food product. For example, a depth sensing mechanism and/or software is used to determine on an ongoing basis the 3D topography of the projection surface (or distance of surface from the projector), and based on this changing topography that may occur when a piece of cake is cut/removed, the augmentation media file is generated anew or modified and projected upon the projection surface. Interactivity may also be provided by tracking movement of the user or utensils/objects (with optical or magnetic markers, for example) near the surface, and based upon detection of such movements or interaction with the projection surface, the augmentation media file may be modified or rendered to include images corresponding to the user actions (e.g., waving a wand near a cake surface that causes flowers to bloom and so on along the detected path of the wand or another responsive change in the projected image).

More particularly, a method is provided for augmenting or enhancing a food product such as the surface or top of a cake or other edible object. The method may include providing a food product that includes a projection surface (e.g., a planar surface, a 3D surface, or the like) and generating an augmentation media file based on the projection surface. The method may further include aligning a projector with the projector surface and then operating the projector to use the augmentation media file to project a projected image on the projection surface of the food product. The generating of the augmentation media file (e.g., a digital data file corresponding to a movie or the like) may include combining a set of storytelling overlay images and a set of user-selected or provided images to generate a composite digital video file. In some cases, a portion of the overlay images are presented concurrently with the user-selected images on the projection surface such as by providing a story-related frame with the user's images/movies shown within the frame.

In some embodiments, the projection surface has a 3D topography or contour, and the generating of the augmentation media file includes mapping the projected image to the 3D topography. In some embodiments, a sense of interactivity is provided by having the augmentation media file be scripted such that audio or visual cues are included that are related to performing an interactive function or action on or near the projection surface (such as cutting the cake, holding up a piece of cake, and so on). In such cases, the projected image may then contain content or images that correspond to the performance of the interactive function (such as include characters that fly or move out of the space created by cutting the cake or the like). In some embodiments, the food product may include an ornament on the projection surface that is selectively movable (remotely controllable) in response to control signals and the augmentation media file may include the control signals and include image segments that are mapped to the ornament and transmitted during transmission of the control signals (e.g., the imagery projected on the ornament changes when it is moving).

In some cases, interactivity is provided by having the method include determining a modification of the 3D topography of the projection surface. Then, based upon the modification of the surface and its shape/contours, the method may further include generating a modified augmentation media file and operating the projector to use the modified augmentation media file to project a modified projected image on the food product. The projected image may include differing sets of images that are each mapped to differing portions of the projection surface such as based on the distance of those surface portions from the projector, based on the topography, or the like. For example, a base image may be projected on one layer/level of the surface, a recessed surface-based image may be projected on the lower or recessed surfaces, and object-based images may be projected upon objects identified by their shape/contours. The method may also provide interactivity by detecting a user interaction with the projection surface and, in response, generating a modified augmentation media file and operating the projector to project a modified projected image on the food product. For example, the modified augmentation media file in such cases may include an image set(s) that is selected for inclusion based on the particular interaction or utensil used in the particular interaction (e.g., differing images if the utensil is a knife versus a magic wand and so on).

BRIEF DESCRIPTION OF THE DRAWINGS

FIG. 4 illustrates a digitally augmented food product, e.g., a cake, using a decorative figure, object, or topper that includes a projector adapted for projecting a video or media upon a surface of the food product, e.g., by playing a video or digital media file stored in memory (e.g., an inserted USB device or the like), received from a wireless communication device, received from a direct digital data communication link/connection, or the like;

DETAILED DESCRIPTION OF THE PREFERRED EMBODIMENTS

Figure 1:
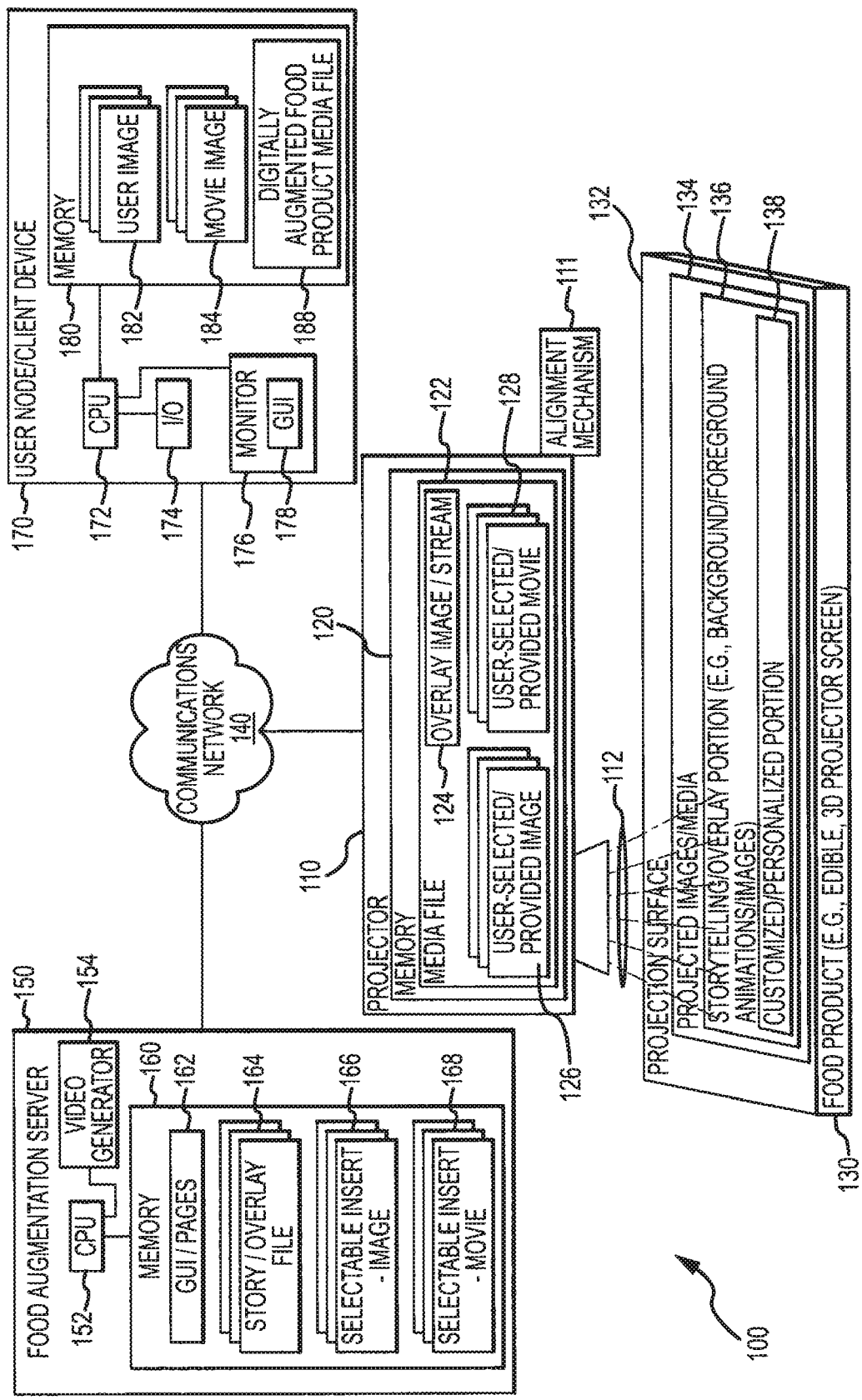
FIG. 1 is a functional block diagram of a system for augmenting or decorating a food product such as a cake with a projected video, e.g., a system for digitally augmenting a cake with a projected image or media.

The present invention involves devices and methods for digitally augmenting or decorating a food product such as a cake with projected images. The digital augmentation or projected images may include a video from a digital media file that is particularly suited for the projection surface(s) provided by one or more surfaces of a food product, e.g., various layers and toppers/ornaments of a cake. The cake or other food product may be thought of as providing an edible, 3D projection screen. In some cases the 3D projection screen is also modifiable (such as when a cake or pie is cut to remove a piece), dynamic/movable (such as when ornaments/toppers/figurines on a cake are moved to new locations), and/or controllable (such as when ornaments/toppers/figurines may be motorized to move in response to remote or local control signals), and these embodiments may provide varying levels of interactivity with the food product that may affect in real time or dynamically the projected image that is provided by the augmentation system (e.g., a projected image may be rendered dynamically to reflect the change in the topography of a cake when a portion or piece is removed).

The inventors were searching for a way to differentiate entertainment and food-based services offered to clients to help the clients celebrate an event such as a birthday, wedding, anniversary, or the like. To this end, the inventors have created a number of techniques for augmenting or decorating one or more surfaces of a food product such as cake or pastry with a projected media, which typically includes a video stream that is digitally mapped or aligned with the projection surface of the food product. In one technique, the food product is augmented with a projected image that is designed to provide an enhanced storytelling experience. For example, the top surface of a rectangular or circular cake may be used as a projection surface for a projector, and the projected image may be from a digital media file that includes a personalized or user-selected/edited video (e.g., a client/user provides still or video images that are intermixed with overlay, background, foreground, or other portions to create a user-specific composite media file for projection on the food product). In a consumer or retail setting, the projector may be provided in a food product decoration (e.g., a cake topper/ornament) that may receive a memory device with the media file or receive a wireless signal with the digital media information for projection.

In a second augmentation technique, the augmentation is scripted such that changes in the projection surface appear to trigger changes in the projected image. For example, the food product may include movable ornaments that are selectively moved or triggered to perform an action, and the projected image may change concurrently with or to suit/highlight such moving ornaments. In another example, a human actor may be performing according to a script that is timed with the projected image, and the human actor may use cues in the projected image or a corresponding audio file to perform certain actions near or on the projection surface. In some cases, the human actor may cut a cake at a particular location upon a particular audio/timing cue (and, in some cases, at a location associated with a visual indicator), and the projected image may appear to respond to such change in the projection surface (e.g., to release a new image such as butterflies or stars, to project on the newly exposed surfaces, and so on). In this way, enhanced storytelling that appears interactive may be provided using a projected image and a 3D projection surface on a food product.

In other embodiments or according to other augmentation techniques, the food products such as cakes are digitally enhanced or augmented in a truly interactive or dynamic manner. Specifically, augmentation methods and systems may be provided that create a way to accurately map and align projected media on to the surface of cakes or other food products. By locating a projector (e.g., a DLP, an LCD-based projector, or the like) above or adjacent to the cake, carefully prepared media may be presented on a 3D or dimensional projection surface of the cake. This allows for a unique form of storytelling and interactivity that may be highly desirable in many event hosting applications such as for birthday party hosting, wedding receptions, and the like. The appearance of basic cake or other food product surfaces/shapes can be visibly altered to represent a variety of story themes with the projected images/media. In addition, the projected media may be changed dynamically as the cake is cut or it or decorations are moved.

In some applications, the cake may be personalized to a child for his or her birthday, and a story can unfold during the storytelling experience. A user (e.g., party guest) may be instructed to decorate and then projection may be used to enhance and reveal what was created by their changes to the food product surface and/or by their selections/changes to digital augmentation media (e.g., selection of video, providing their still or video images, and other user editing of the augmentation media file). In addition, the augmentation system may be used as a pre-visualization tool so that the cake decorator and baker can experiment with projected designs prior to creation for new designs (e.g., choosing various frosting/decoration designs that may be projected on a base cake shape and/or surfaces to visualize a planned design). Templates for basic cake shapes may be created and stored in memory of the augmentation system to expedite the media creation for new designs. Conversely, these templates may be accessed online by customers/users so that they may design and order their special cake or food product prior to visiting an event facility, thus allowing a customized experience upon arrival at the facility. Any of the augmentation systems may also be provided to users via retail channels for use at home or other locations to create events incorporating digitally augmented food products.

The interaction with the food product may be provided in a number of ways. In some embodiments, the interaction may be based upon sensing or tracking the topography or shape/volume of the projection surface (e.g., of a cake) and then updating/modifying the projected image based on detected changes (e.g., movement of decoration on the top of cake, cutting and removing a piece of cake, and so on). The tracking of the projection surface topology/shape may be performed using one or more presently available (or later developed) spatial measurement technology, e.g., a 3DV Z-Cam or a secondary camera sensing a structured light pattern being projected on the projection surface. This depth or shape sensing enables the augmentation system to react to changes in the shape of the cake or other food product itself. In other cases, techniques that do not require volume/distance sensing may be used to detect shape changes/interaction with the cake or food product, such as use of retroreflector material (as discussed further below) and the like.

For example, the projected image may include a lake located on a surface of a cake, and a computer system running a depth/topology processor module or program may determine when and where a piece is cut out of the cake. In response, the computer system or system controller may render the projected image with the new surface topology to provide a waterfall flowing from the lake into the void or resulting space in the projection surface corresponding to the removed piece of cake to form a pool on the cake pan or recessed cake surface. Alternatively or additionally, the depth information may be used to measure/detect the position of props/objects on the surface of the cake or other food product. A portion of the augmentation image may be associated with such props/objects and when they are moved the projected image may be updated to track or follow these objects. For example, ghosts may fly around tombstones even as and after they are moved from a first to a second (or third) position on the surface of the cake or projected butterflies may be attracted to physical prop flowers wherever the flowers happen to be located on the cake (or 3D, edible projection surface).

In another interactivity application, interaction with the cake or other food product is achieved through the use of tracked or sensed props that may be manipulated by a human actor or system user near the cake or food product projection surface. A prop in this sense may include any form of handheld object that can be tracked using standard methods of object tracking (e.g., magnetic tracking, infrared tracking, image-based sensing, and so on). Movement of the prop near the cake may result in updating the augmentation media file or rendering of a new projected image that is presently or concurrently being projected on the projection surface provided by the cake. For example, an operator may be holding a magic wand prop and in response to a detected waving of the wand, the projected image may be modified to include fairy dust particles that are projected on the cake in a pattern that at least somewhat matches the movement of the wand. In other applications, an actor may hold a flashlight prop near the cake to apply a spotlight on the projection surface, and, the projected image may be updated to include revealed items in the sensed spotlight such as ghosts, creatures, treasure, and so on. In yet another example, the human actor or user of the system may use a knife or serving implement that is tracked by the system so that the projection may be updated in responsive manner depending upon where the utensils are moved (e.g., butterflies may be added to the projected image to stream out of the cake where or near the cut or a piece of cake that is being lifted out may include a projected message). In other cases, the tracking of the movements of props may be used to activate or control supplemental system components such as lights, audio components, and the like to provide special effects (e.g., the effects are triggered by sensed prop movement/use such as a scream when the cake is cut in a particular location, flashing LED lights when a prop is touched/moved, and so on).

FIG. 1 illustrates one embodiment of a food product augmentation system 100 that may be used to digitally enhance or decorate a food product 130. The food product 130 may be a cake, a pastry, a cookie, a pie, or nearly any other food that is useful for providing a 2D or, more accurately, three-dimensional (3D) projector screen that is also edible (at least in part and/or many applications). For example, the food product 130 may take the form of a rectangular, circular, or other-shaped cake. The food product 130 includes one or more exposed surfaces or sides that provide a projection surface 132, and the system 100 includes a projector 110 (e.g., a conventional digital light processing projector (such as a projector using DLP® technology available from Texas Instruments, Inc. or the like), an LCD video projector, or another digital video projector) that has its output light 112 directed toward or onto the projection surface 132 as projected image/media 134.

An alignment mechanism 111 is provided to align the output 112 of the projector 110 with the projection surface 132 to place the projected image 134 and its components/content in desired locations on the food product 130. The alignment mechanism 111 may include a support frame for hanging the projector 110 a predefined distance above a table or support for the food product 130 and at a particular X-Y position relative to the projection surface, and the mechanism 111 may further include a component for assuring positioning of the food product 130 on the table or other food product support. In other cases, the output 112 may include, at least initially, one or more alignment components for use in properly centering or aligning the food product 130 such as a dot or crosshairs for the center or corners/edges of the food product 130.

With the food product aligned with the projector 110, the projector 110 may be operated to provide the projected image/media 134 on the projection surface 132. Typically, the projected image 134 may include a storytelling or overlay portion 136 as well as a customized/personalized portion 138, while other embodiments may only include one of these components/portions. The projector 110, for example, may include memory 120 that is accessed by the projector 110 to provide the output 112 using one or more media files 122, which may take a wide variety of forms but may be digital video or movie files in a number of well-known or to be created formats used with digital projectors. The media file 122, and, hence, the projected image/media 134, may include an overlay image/stream 124 and also one or more user-selected or provided images 126 and/or one or more user-selected or provided video or movie clips 128. The storytelling/overlay portion 136 of the projected image 134 would typically correspond to the overlay image/stream 124 while the customized/personalize portion 138 may correspond to the user selected/provided images and movies 126 and 128.

In practice, the projected image 134 may be thought of as a composite image stream combining system provided images/image streams with those chosen or provided by a user/operator to create a customized and/or personalized projected image 134 (and corresponding celebration event using system 100). For example, the storytelling/overlay portion 136 may include images and text indicating the progressing of a storyline and/or may provide framing images (such as characters from a celebrant's favorite movie, images related to their interests, and so on) with the customized portion 138 providing the storyline/content (e.g., the portion 138 may include still images 126 showing the celebrant at various stages of their life from an infant until present day, may include still images showing their interests, their favorite characters, and so on, may include movies of them at their wedding, of their last game, or of other times of interest). The storytelling/overlay portion 136 may form a frame about the customized portion 138, may be provided side-by-side or within the portion 138, or nearly anywhere on the projection surface 132. Likewise, the customized/personalized portion 138 may be provided in numerous locations on the projection surface, and in some cases, two or more of portions 136 and/or 138 are utilized within the projected media 134 to create a desired effect.

The system 100 may be operated with the projector 110, alignment mechanism 111, and food product 130 with the memory 120 being used to store the media file 122 (such as by inserting a USB or similar memory device into a port on the projector 110, by inserting a disk in the projector, or by otherwise loading the memory 120 with a digital augmentation file such as by direct connection to a storage device or network). In other cases, though, the projector 110 may not store the media file 122 and may be fed the projected image/media 134 such as from food augmentation server 150 or another computer/control device in real time or for only temporary storage.

As shown, though, the system 100 may be adapted to support an online process or a decoration process that may be handled more locally (e.g., provide the server 150 and/or client device 170 at a decorating/augmenting facility or the like). As shown, the system 100 includes a food augmentation server 150 that is in communication with the projector 110 and with a user node/client device 170 via a communications network 140 (such as the Internet, a LAN, a WAN, or other digital communications network). The food augmentation server 150 may include a processor 152 that runs a video generator 154 to create the media file 122 used to provide the projected image/media 134. The processor 152 may also manage memory or data store 160, which is used to store files/data 162 for use in generating one or more graphical user interfaces (GUIs) and/or served web pages/forms to the user node 170.

The user node 170 may be nearly any computer or electronic device that is useful for communicating in a wired or wireless manner with server 150 over the network 140, and the user node 170 may include a processor 172 and input/output (I/O) devices 174 as well as a monitor 176. During use, an operator of device 170 may access a web site served by server 150 and have a GUI 178 displayed on their monitor 176 via their browser or other application. The GUI 178 may be adapted to allow a user to decorate a cake or other food product 130 with a user-created/selected media file 122, 188 that is created using video generator 154. For example, the GUI 178 may prompt the user to first select a food product 130 to decorate, and then, in response to their decision, to prompt the user to choose among a set of storytelling/overlay files 164 suited for that food product 130.

In practice, the digital still and video images may be stored in a variety of useful forms and formats, e.g., the movie files 184 and media file 188 may be formatted per one or more of the MPEG or similar compression standards for video and audio data. In this description, the generation, transfer, and storage of video and/or audio files is not intended to be limited to particular methods of formatting, transferring, and storing such video and/or audio information/data, and the terms media file, video, movie, user image, projected image or media, and the like are used in their conventional and general meanings and some of these terms may be used interchangeably.

The GUI 178 may further allow the user to choose among a set of selectable images 166 and/or movies/videos 168 for inserting into the chosen storytelling file 164, and the video generator 154 and GUI 178 may also allow editing of the food product media file such as to choose where and when the selected images and movies 166, 168 are provided in a projected image. Further, in some embodiments, the user of node 170 may be prompted via GUI 178 to provide one or more of their own user images 182 and movie files 184 from memory 180 (or from another location/device on network 140) for insertion by the video generator 154 into the augmentation media file 188, which may be stored on the user's device 170, on the server 150, and/or on the projector 110 (or a device associated with the projector 110). The user may then provide the digitally augmented food product media file 188 over the network 140 or at the location of the projector 110 for use in outputting 112 the projected image/media to augment the cake or other food product 130.

Figure 2:
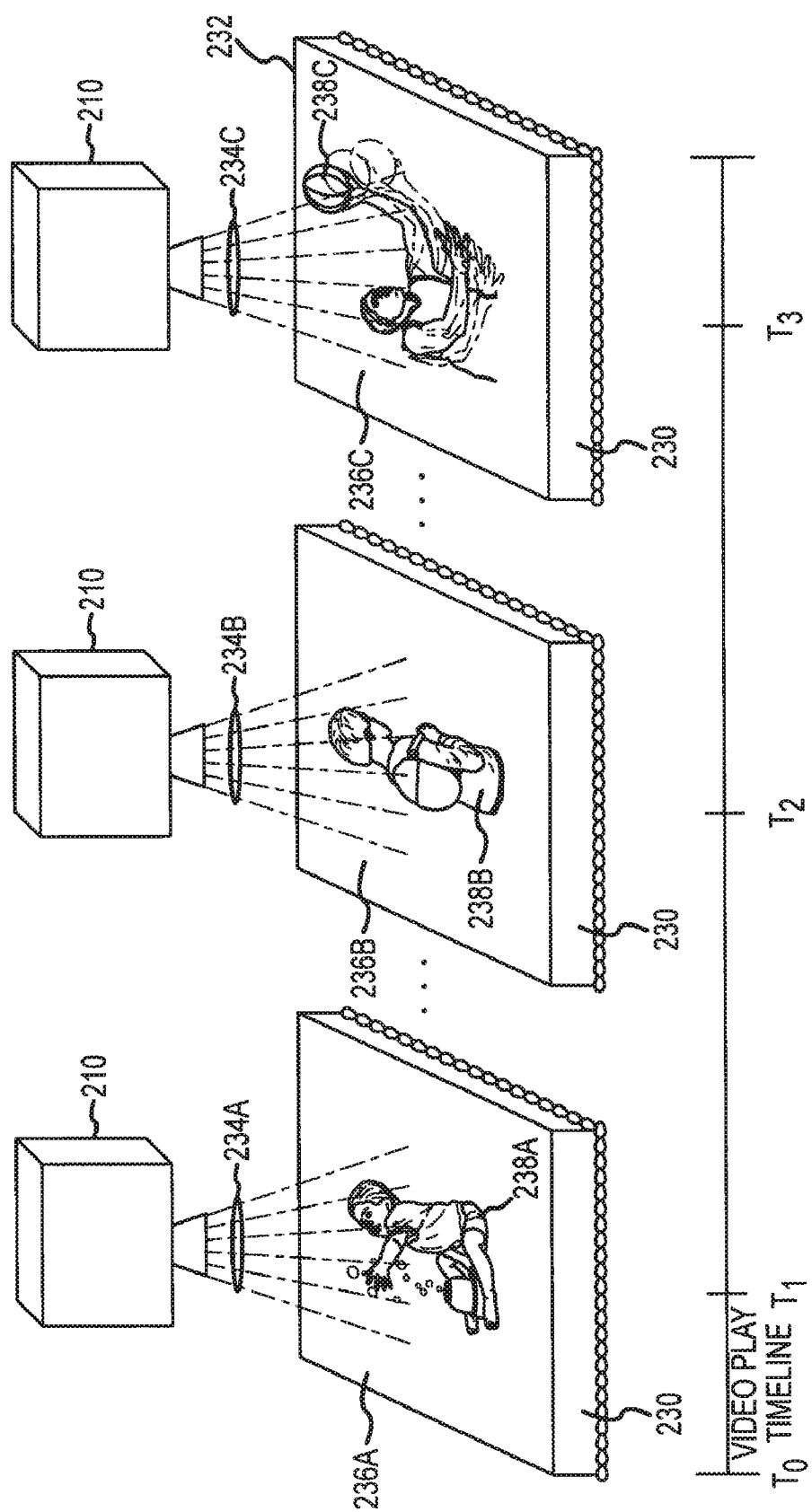
FIG. 2 illustrates use of a projector (such as the projector of the system of FIG. 1) to digitally augment a food product (e.g., a cake) with a projected video image.

FIG. 2 illustrates use of a projector 210 (which may be a specific implementation of projector 110 of system 100) to digitally augment or decorate a food product 230. The food product 230 is shown as a rectangular, 3D object such as a rectangular sheet cake but other shapes may be augmented as taught herein. FIG. 2 illustrates use of the projector 210 to project 234A a projected image on projection surface 232 on food product 230 at a first time (along a video play timeline or use of projector 210). At this first time, $t_1$, the projected image 234A includes a first overlay image or portion 236A and a first customized/personalized portion 238A, which may be the celebrant of a birthday party as a baby. At a second time, $t_2$, the projected image 2346 may include a second overlay image or portion 236B (which may be the same or different than portion 236A) and a second customized/personalized portion 2386, which may be a still image (or movie) of the celebrant at a second age or show another user-selected image. Likewise, at a third time, $t_3$, the projected image 2340 may include a third overlay image or portion 2366 (which may be the same or different than portions 236A, 2366) and a third customized/personalized portion 2380, which may be another still image of the celebrant or chosen by for that person or a movie clip chosen for or by that person to customize the projected image 234C. In this manner, the food product 230 is digitally enhanced with a video image that, at least in this example, includes a composite image including a storytelling/overlay portion along with a customized/personalized portion with user selected and/or user provided images/videos.

Figure 3:
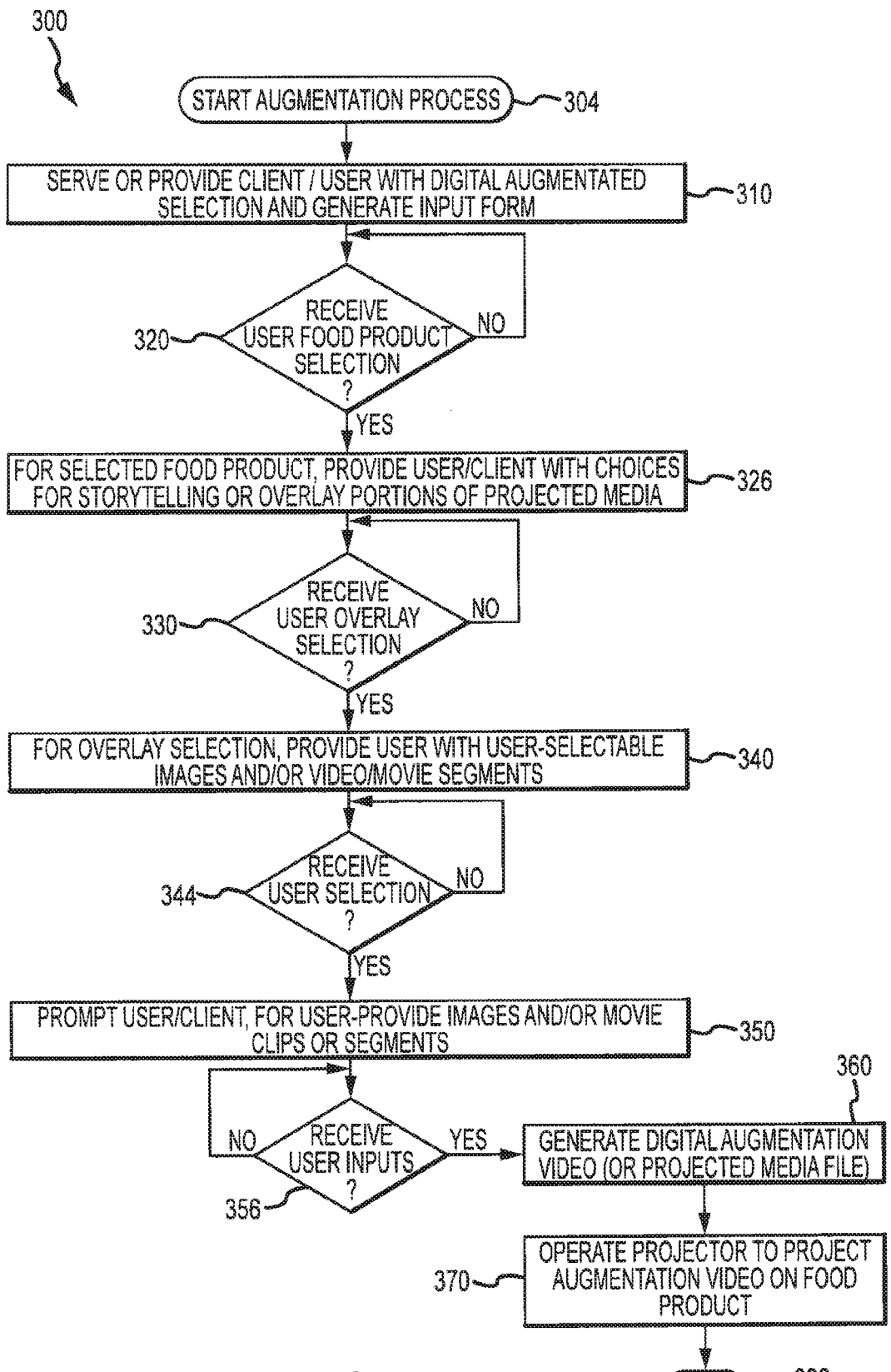
FIG. 3 shows a flow diagram of a method for digitally augmenting food products such as may be implemented with the systems of FIGS. 1 and 2.

FIG. 3 illustrates an augmentation method 300 as may be provided by operation of the system 100 of FIG. 1. The method 300 starts at 304 such as by generating a set of storytelling files or image streams that may be used by a user for creating a video for projecting on a cake or other food product. This may involve defining a set of cake or food product shapes and sizes and storylines and then creating background, foreground, framing, and other images for use as a base video (e.g., a storybook with a plurality of images that may be shown in a video or slideshow format with spaces or gaps that may be filled by user selected and/or provided images/videos). The step 304 may also involve storing a number of selectable images and movies 166, 168 to be presented to a user for each story/overlay file 164.

At step 310, the method 300 may include serving or providing a client or user with a digital augmentation selection and generation input form. For example, the system 100 may be operated to serve with the server 150 one or more GUIs/pages 162 to a client device 170 to request the user to choose a food product for decorating or augmenting (e.g., do you want to decorate a rectangular or circular cake, what size, would you like to augment a chocolate fountain, and such prompts may include photos/images of various "base" products or projector surfaces 132 or edible, 3D projector screens). In other cases, the user may simply access such data via the client device 170 such as when the user is using a client device at an event facility rather than pre-defining the projected image. At 320, the method 300 continues with receiving the user product selection from the user such as by the user selecting from a pull down list in a GUI 178.

At 326, based on the selected food product, the method 300 continues at 326 by providing the user/client with choices for storytelling or overlay portions to include in the projected media. For example, the video generator 154 or other program module of server 150 may update the GUI 178 to include a set of story/overlay files 164 suited for use with or corresponding to the selected food product 130. At 330, the method 300 continues with receiving a user overlay selection, which again may be provided via the I/O 174 of client device 170 and/or GUI 178 over the network 140 to augmentation server 150 and may indicate one of the story/overlay files 164 to use in generating a media file 122, 188 by the generator 154. At 340, the method 300 includes for the overlay selection providing the user with user-selectable images 166 and/or video/movie segments 168 for inclusion in the media file 122, 188. At 344, the method 300 continues with receiving a user's selection of none, one, or more of the selectable portions 164 and 166, and, in some cases, a selection of when and where in the projected image 134 the selections are to be presented (e.g., in what order, in certain geography of the projection surface 132, and so on).

At 350, the user is prompted such as via GUI 178 to provide images 182 and/or movie clips 184 for inclusion in the video stream generated by video generator 154. At 356, the method 300 includes receiving the user's inputs (or an indication that no user provided images or files are to be provided) that may provide one or more of the images 182 or movie files 184 from memory 180. At 360, the video generator 154 (which may be run on device 170) operates to generate a digital augmentation video (or projected media file) that may be stored on server 150, provided as media file 122 to the projector 110, and/or stored in memory 180 of the client device 170 as shown at 188. At 370, the method 300 includes operating the projector 110 to project 112 the augmented video or image 134 on the surface 132 of the food product 130. The method 300 then ends at 390.

Figure 4:
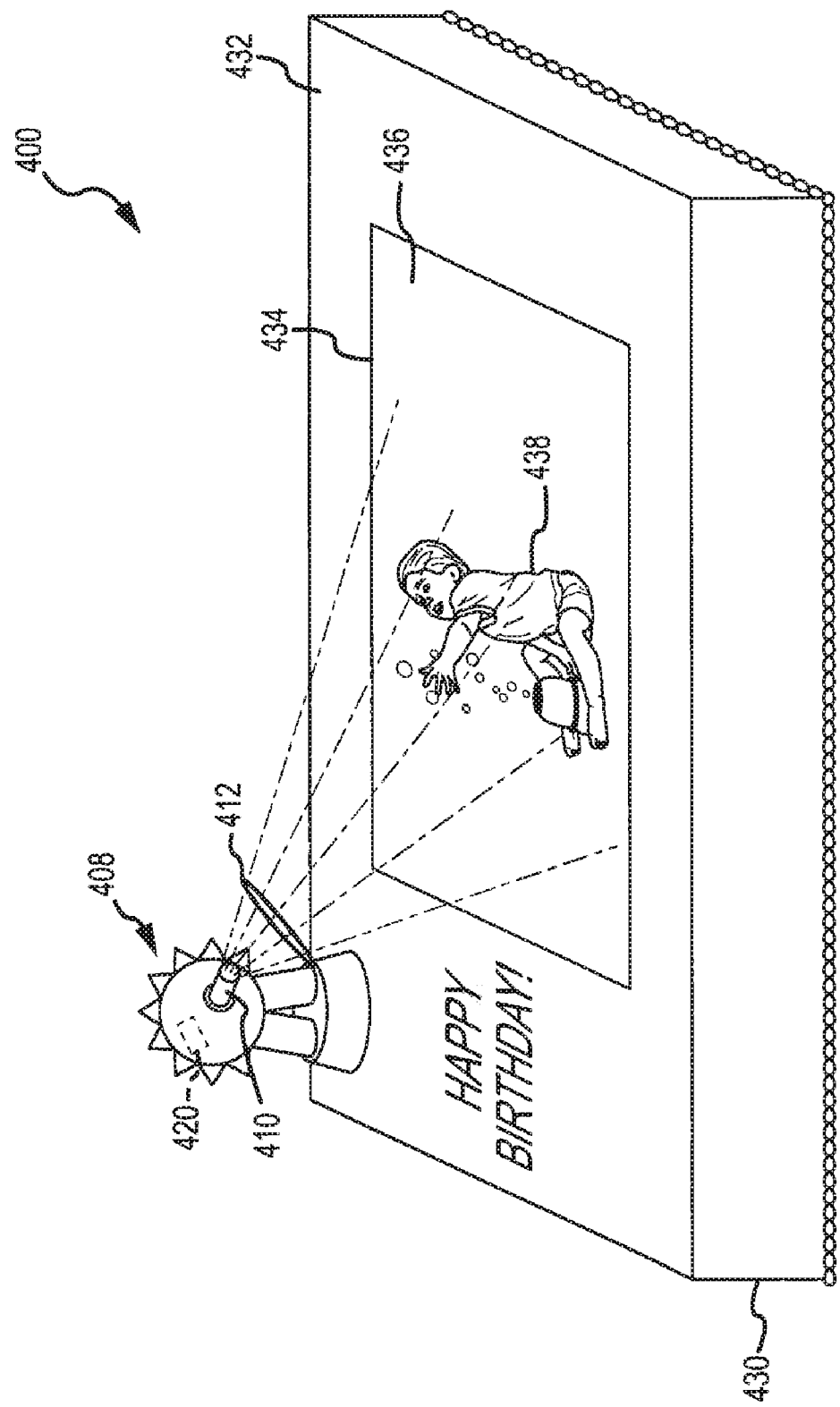

As discussed above, the projector may be provided in the form of a conventional digital projector such as a DLP, but, in other embodiments, it may be desirable to provide a projector that can be placed directly upon or near the food product. FIG. 4 illustrates an augmentation system 400 that is readily implemented in a retail or residential setting to celebrate an event by decorating or enhancing a food product with projected images. As shown, the system 400 includes a food product 430 (e.g., a cake or the like) with a 3D edible projection surface 432. The system 400 also includes a decoration or ornament 408 adapted for placing on the projection surface 432 such as in the form of a cake topper or ornament. The decoration 408 includes a digital projector 410 configured for projecting 412 using a digital media file stored in memory 420 (e.g., the decoration 408 may have a USB port for allowing the transfer of an MPEG or other movie file to the memory 420 or this may be done by wired or wireless data transfer in real time during projection 412 or for storage in memory 420).

The projector assembly 408 may be configured for use with a particular food product (e.g., size and shape) and operated by placing in a particular location and orientation prior to use (e.g. a corner, an edge, a central location, and so on). In other cases, the projector assembly 408 may be useful with two or more food product configurations and/or have a projector 410 that can have its focus and other operating parameters adjusted to facilitate use. During use of the system 400, the projector 410 outputs (as shown at 412) a projected image 434 on the projector surface 432 of the food product 400. The projected image 434 may include an overlay or storytelling portion 436 and a customization/personalization portion 438, as discussed above with reference to FIGS. 1-3.

Figure 5:
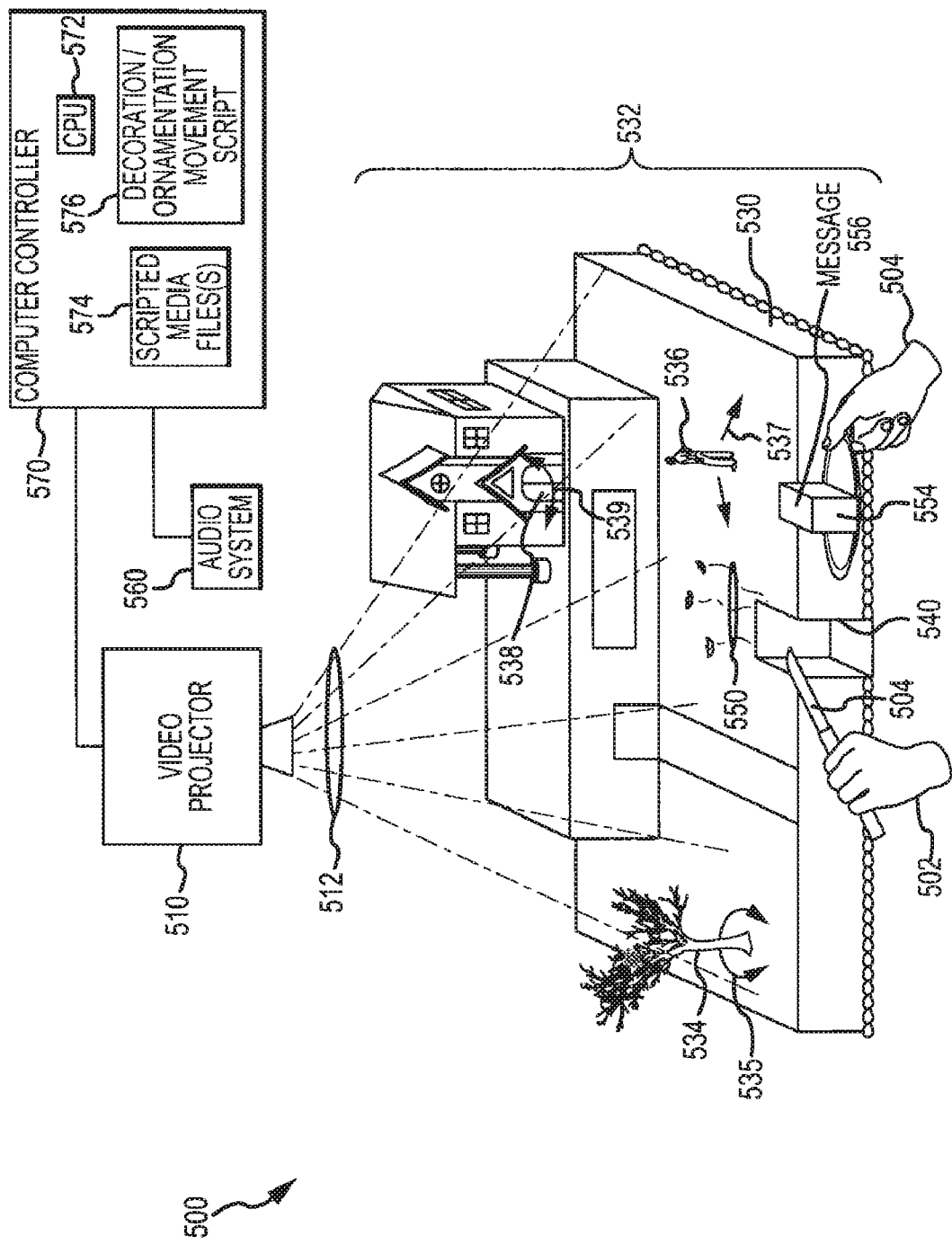
FIG. 5 illustrates a digital augmentation system for using scripted video, audio, and control files for digitally augmenting an edible, 3D projection surface such as a multi-layered cake with selectively movable ornaments/decorations.

In other embodiments, it may be desirable to digitally enhance or augment an edible, 3D projector screen with a scripted movie or image so as to provide the appearance of an interactive food product/imagery. FIG. 5 illustrates a food product augmentation system 500 adapted to enhance or decorate a food product (such as a multi-layer cake or the like) 530. The projector 510 is controlled or operated by a computer/controller 570 with a CPU 572 that is used to selectively transmit scripted media files 574 to the video projector for projecting as projected image or media 512 on the 3D projector surface 532, which includes all the layers and/or decorations upon the surfaces of the food product 530 exposed to the projector 510. The controller 570 may also use the media files 574 to operate an audio system 560 to output a soundtrack or audio stream associated with the projected image 512. For example, the audio system 560 may be used to provide audio cues or triggers indicating to a human actor or person interacting with the food product 530 to take particular action such as cutting a piece off to "cause" a scripted or upcoming part of the media file 574 and projected image 512.

The food product 530 may include multi-layers as shown and also include a number of ornaments or toppers 534, 536, 538. In some embodiments, the controller 570 may use a decoration/ornamentation movement script 576 that corresponds to the media file 574 (or is a part of such file) to provide operating signals to the ornaments 534, 536, 538 that may take the form of motorized or operable figurines or the like that move 535, 537, 539 on the 3D projector surface 532. The projected image 512 may vary when such movement occurs to create a unique effect (such as by highlighting these moving ornaments 534, 536, 538 with brighter light, with differing colors, with flashing lights, and so on). As with the augmentation systems of FIGS. 1 and 2, the projected image 512 typically will change over time to tell a story and entertain viewing guests.

The media file 574 is "scripted" in the sense that it may provide changes or differing projected images on all or portions of the cake or other food product 530 at predefined times or points in the projection. These changes or new effects may follow cues or triggers (audio and/or visual) used to indicate to a human actor that it is time to take a predefined action. For example, FIG. 5 illustrates an operator or actor 502 using a utensil such as a knife 504 to cut a piece 554 of cake (or other food product) 530, and this produces a space, void, or recessed surface 540 in the 3D edible projector surface 532. If the cutting by actor 502 occurs at a cued or scripted time, the projected media 512 may then "react" by showing something new such as birds, butterflies, or the like flying outward from the exposed surfaces 540. Other scripted aspects may include displaying a message or image 556 on one or more surfaces of the piece (or other object) 554 held by actor 504 in a particular location relative to the surface 532 (e.g., "Happy Birthday, Joey!" or some other personalized or standard message and/or images).

To an observer, the projected images 550, 556 may appear to be occurring in response to actions taken by the actor 502, 504, which provides a simulation of an interactive food product 530 (or interactive display 512). Note, also, that the media file 574 is typically selected to suit a particular edible 3D projector surface 532 and its particular 3D topography to enhance depth, show textures, and other features on the surface 532 (e.g., the portions of image 512 projected onto decoration 534 may differ from that project upon decoration 536, the top of decoration 534 may be green to show leaves while the bottom is brown to show tree bark, and so on). In contrast, without projected image 512, the surface 532 may have a different appearance (e.g., an all white frosted cake or the like).

In some embodiments, it may be desirable that the food product be augmented or enhanced to provide true or real time interactivity with a user or human operator/actor. Such interactivity may take the form of tracking changes in the topography (or shape/3D texture) of a projection surface on the food product. The interactivity may also take the form of tracking of use, movement, and/or positioning of interactive tools/objects. In some embodiments, both forms (and/or other forms) of interactivity are provided in a single system, while other cases may involve providing one of these interactivity techniques. The system 600 shown in FIG. 6 provides both forms of interactivity while the system 700 shown/described in FIGS. 7-10 shows use of sensing changes in topography to provide interactivity with a digitally augmented food product.

Figure 6:
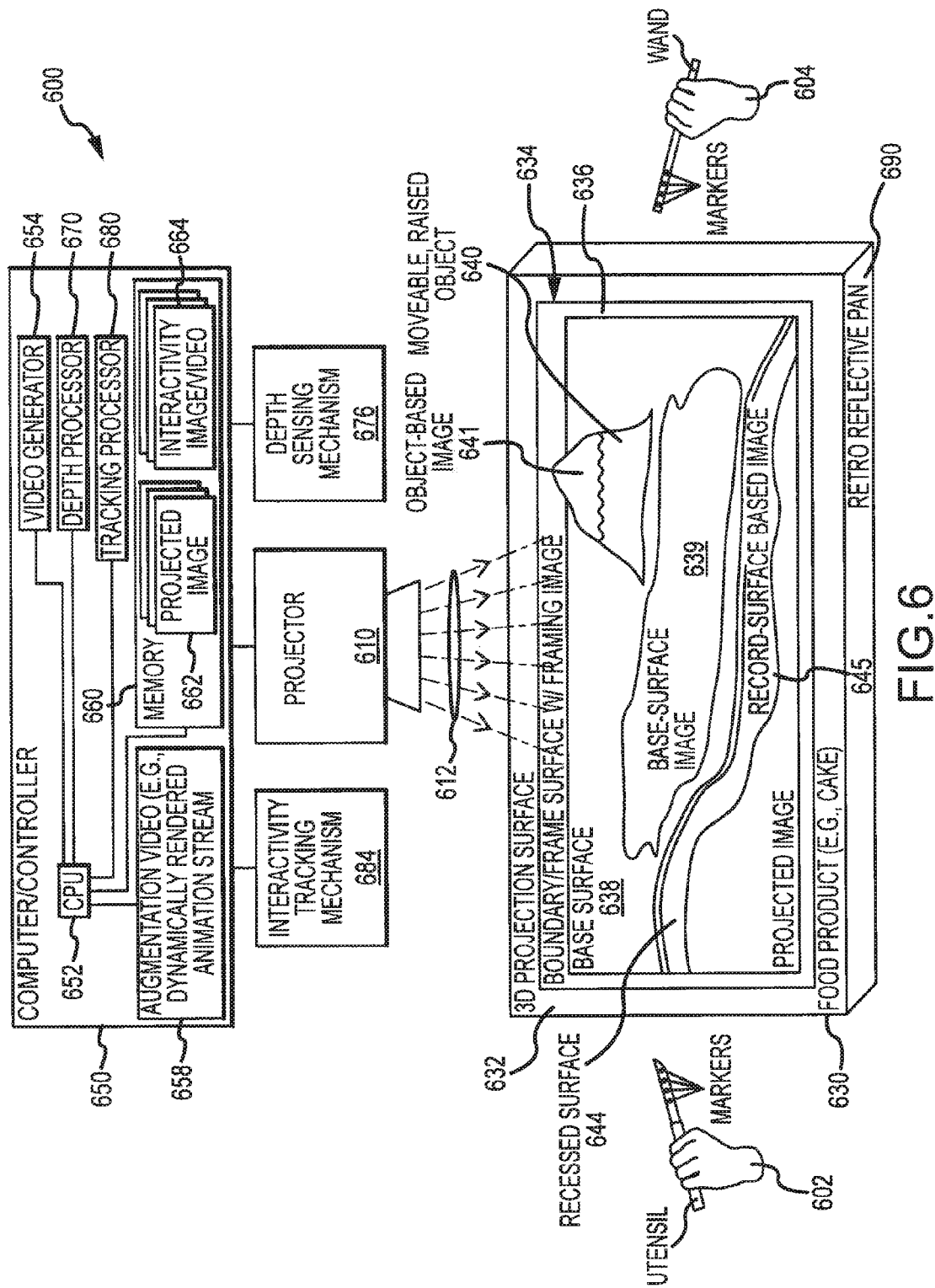
FIG. 6 shows another food product augmentation system in accordance with an embodiment of the invention that is useful for generating an augmentation video that dynamically changes based on user interactivity and includes devices for determining changes in depths or topography of a 3D projector surface and/or for sensing and tracking a user's interaction with the 3D projector surface.

With reference to FIG. 6, the augmentation system 600 includes a projector 610 that is operable to display 612 a projected image 634 upon a 3D projection surface 632 of a food product 630. The projection surface 632 may include a base surface 638 (e.g., a layer of a cake or the like at a particular height above a pan 690 or support surface or a distance/depth from the projector 610 (or its projection lens)), a recessed surface 644 at a lower height relative to the pan 690 or further away from the projector 610, and one or more raised (and optionally movable) objects 640 that are closer to the projector 610 than the base surface 638. The projected image 634 is designed to provide a boundary or framing image 636 on the base surface 638 and a differing base-surface image 639 on the base surface 638. The projected image 634 includes a differing image 645 that is projected onto the recessed surface 644 and yet another image 641 that is projected onto the raised object 640. For example, the recessed-surface image 645 may be a flowing river while the base-surface image 639 is grass blowing in the wind and the object-based image 641 also differs (e.g., snow and rocks when the object 640 is a mountain, leaves and bark when the object 640 is a tree, and so on).

Significantly, the system 600 is adapted to modify (e.g., render in real time or in a responsive manner) the projected image 634 based on sensed changes in the topography of the 3D projection surface such as changes to the base or recessed surfaces 638, 644 or movement of the object 640. To this end, the system 600 includes a computer/controller 650 with a CPU 652 that runs a video generator or similar program(s) 654 that modifies an augmentation video 658, which may be a dynamically rendered animation stream that provides the projected image 634 that is stored in memory or buffered as it is fed to the projector 610.

The system 600 includes a depth sensing mechanism 676 communicatively linked with the controller 650 that provides data in an ongoing manner to a depth processor 670 to determine changes in depth or the topography of the 3D projection surface 632, and these changes in topography of surface 632 are fed to the video generator 654 for use in creating/updating the augmentation video 658. This updated and/or dynamically rendered video stream is fed to the projector 610 for projecting 612 as projected image 634 with the framing image 636, the base surface image 639, the object-based image 641, and the recessed surface image 645 in the proper locations. The depth sensing mechanism 676 may include one or more depth sensing cameras (e.g., one or more Zcam™ depth sensing cameras available from 3DV Systems or the like). In other cases, the depth sensing mechanism 676 may include an infrared (IR) flood device and IR sensitive camera and pan 690 with a retroreflective surface may be positioned under the cake or food product 630. In use, the camera would see shadow or nothing if the cake/food product 630 is present and reflection of IR if cake or a piece/slice is removed to expose the pan 690.

The system 600 may also include an interactivity tracking mechanism 684 that is adapted to collect tracking or interactivity data related to movement of an operator or human actor 602, 604 near or over the 3D projection surface 632. The collected tracking data is passed to the controller 650 for processing by the tracking processor 680, which, in turn, provides interactivity location and other information to the video generator 654. The video generator 654 then may act to create a new or updated augmentation video 658. The video 658 may be generated in part as including a projected image 662 or a video 664 from memory 660, e.g., the response to a particular interactivity action (such as waving a wand) may be to display an image at the detected interactivity location or display a video clip at this location. As shown, a user or operator 602 may use a utensil such as a knife with markers to cut the food product 630 or a user or operator 604 may use a magic wand with markers to interact with the food product 630. Such interactions may be tracked by tracking mechanism 684 and data processed by tracking processor 680 such that the video generator 654 may in real time or in response update/render the augmentation video 658 to alter the projected image 634 to respond to the tracked interaction by the user 602, 604.

There are numerous options available for tracking the user 602, 604 when they interact with the food product 630 or the projected media or image 634. For example, magnetic trackers or markers may be provided on the utensils (such as a knife blade or handle), on a wand, or on movable decorations such as object 640. Then, the tracking mechanism 684 would be selected for use in tracking motion and/or location of such magnetic trackers/markers, and, in one case, magnetic six degree-of-freedom (DOF), 3D, or similar trackers are used (e.g., such as available from Polhemus, Ascension Technology Corporation, or other distributors).

In another embodiment of system 600, optical trackers or markers are provided on the items/objects to be tracked such as marker-based 6 DOF optical trackers such as those available from PhaseSpace Inc. (which is a motion capture system that may be LED based with use of markers and cameras), NaturalPoint, Inc. (a NaturalPoint™ tracking system which is retroreflector based), Vicon (which is a digital optical tracking system that may be marker based), or other developers/designers/distributors, and, in each of these cases, the tracking mechanism 684 and tracking processor/software 680 would be selected to suit tracking of such optical marker devices. In other cases, the tracking mechanism 684 and software 680 provide an image-based tracking system that may act to analyze images of the user (or items held by the user) to determine how he/she is moving relative to the 3D projection surface 632 (e.g., silhouette-based tracking as may be provided by Organic Motion, gesture recognition as may be provided by GestureTek, or the like). In each of these cases, the user and/or their utensils (or handheld items) may be tracked and then the augmentation video 658 (and projected image 634) is updated in real-time based upon the user's actions. For example, water may flow into a space where a piece of cake is tracked as being removed based on user's actions or flowers may be caused to grow in the image 634 where a magic wand is tracked as touching or passing the cake surface 632 or ghosts may stream out of a gap in the surface 632 when a knife is tracked/sensed as cutting the cake 630.

Figure 7:
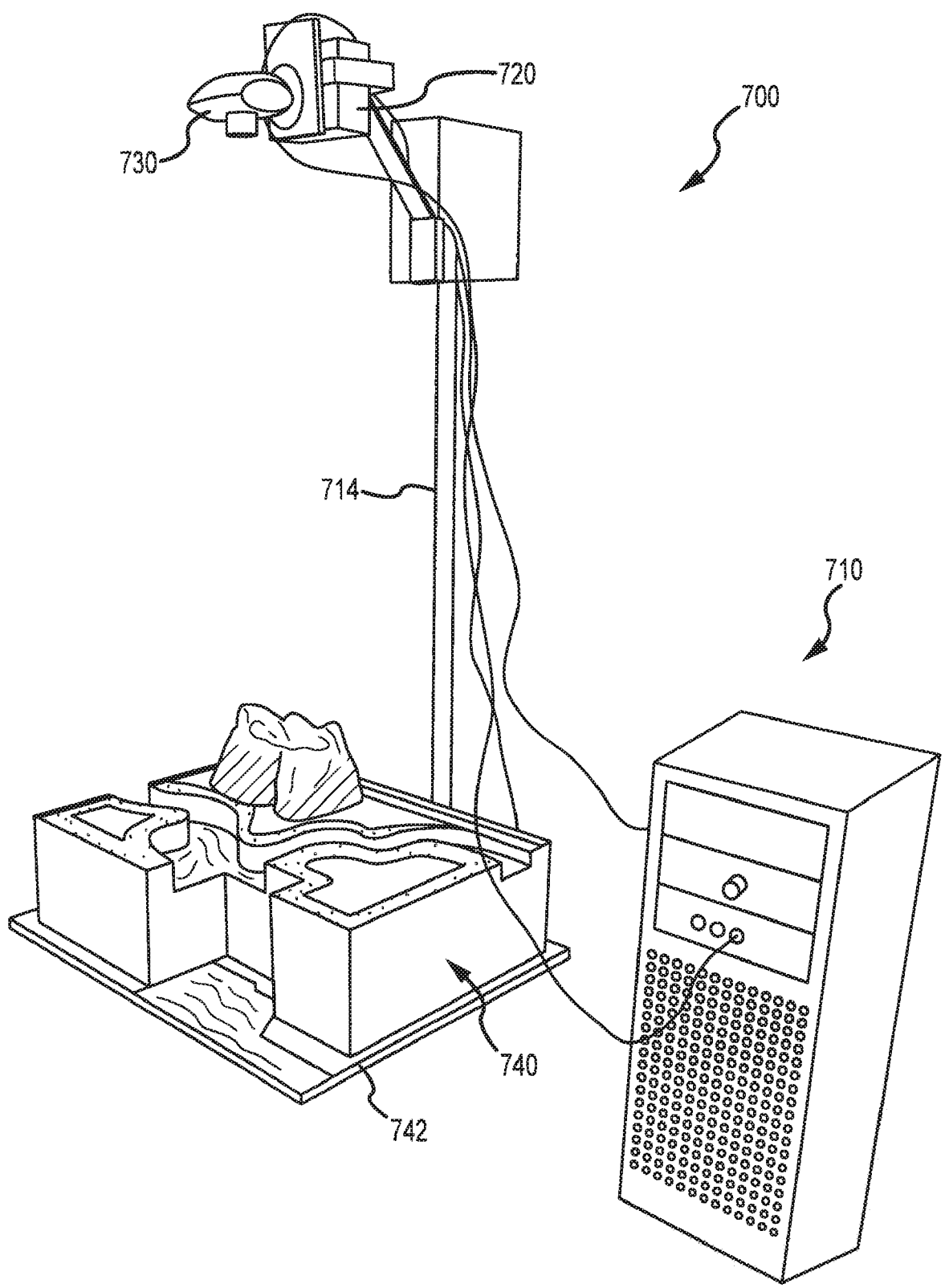
FIG. 7 illustrates a food product augmentation system adapted for using a depth sensing mechanism along with real-time updating of a projected image stream or video feed to a projector to support interactivity of a user with the food product.

FIG. 7 illustrates an embodiment of a digital augmentation system 700 that is adapted for providing interactivity tracking based on changes in the shape or topography of the 3D projection surface provided by a food product (e.g., a cake in this exemplary system 700 but useful with nearly any edible product). As shown, the system 700 includes a computer or controller 710 that provides or runs hardware and software to track changes in the surface topography and to render an augmentation video based on a determined present/existing surface shape, which may include current locations of movable decorations or objects. The system 700 includes a projector 720 controlled by the computer/controller 710 to project an augmentation video or media for the existing 3D topography of food product or cake 740. The projector 720 may be supported on support or frame 714, which may also act as or be part of an alignment mechanism used to align the food product 740 (or its top/projection surface) with the projector 720.

To track changes in the cake's surfaces, the system 700 includes a depth sensing or topography tracking mechanism 730 (such as depth sensing camera(s)) that provides depth or distance related information to the computer or controller 710 for processing to determine the present topography of the food product 740. Based on this determined, current topography or shape, the computer 710 (or its hardware and software components) functions to render a modified augmentation video or media that is then transmitted to the projector 720 for projection on the food product 740. The food product 740 is placed on a support plate/pan 742, and, in some cases, the projected image is rendered to suit all exposed images including the pan 742. For example, as shown, one or more pieces of cake 740 are cut out and removed exposing the pan 742, and the computer 710 determines this topography and renders in response/real time a new augmentation video that is projected onto both the food product surfaces and the exposed portion of the pan 742 (e.g., with a river flowing onto the recessed surface provided by the pan 742 with the video generation program being designed to provide water on all surfaces at a depth or distance from the tracking mechanism 730 that is greater than the base surface of the food product 740).

Figure 8:
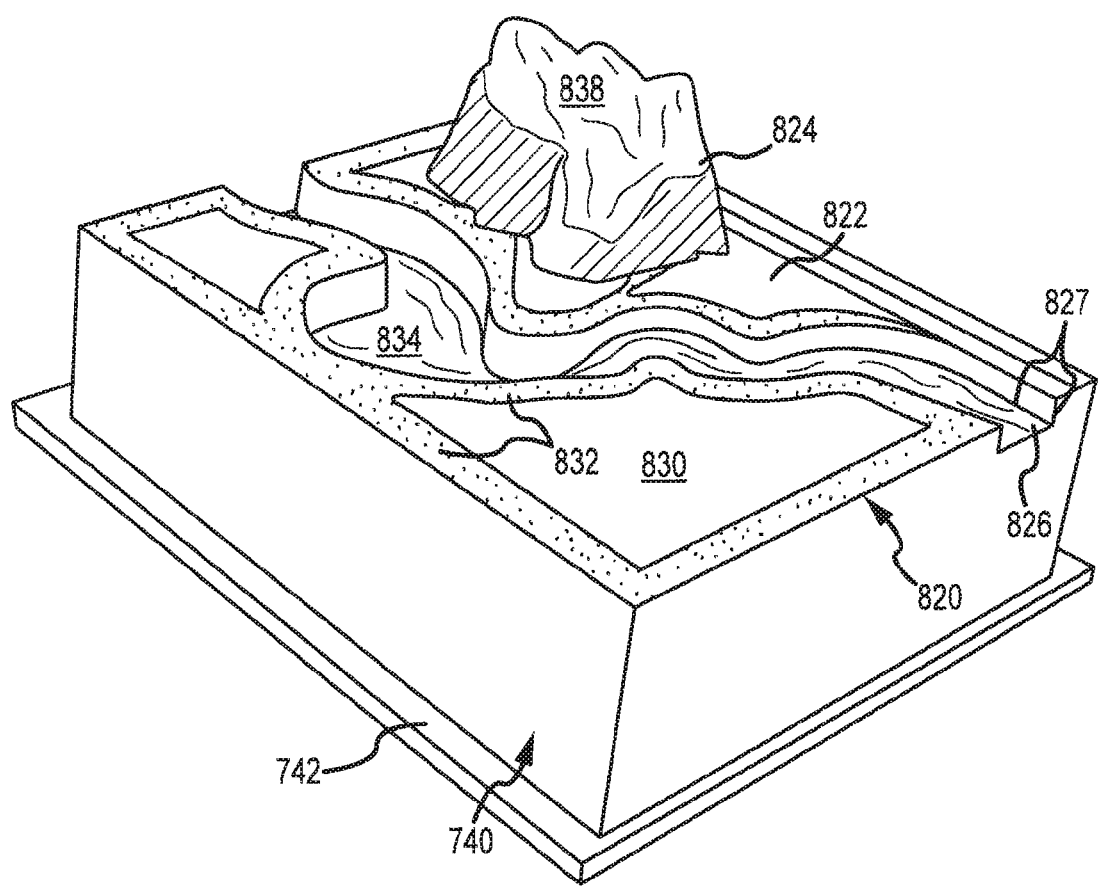
FIGS. 8-10 illustrate in more detail the food product in a first or original state showing a first or original image projected a 3D projector surface of the food product, in a second state showing a portion or piece of the food product being cut, and in a third state in which the portion or piece of the food product has been removed and the projected image has been modified/updated based upon detected change in the depth or topography of the 3D projector surface.

FIG. 8 illustrates the cake 740 in more detail showing a 3D projection surface 820 exposed on top of the cake 740 to the projector and projected images. The projection surface 820 includes a base surface 822 that, in this example, is a planar surface at a predefined depth (or distance from a projector/depth sensing mechanism). The surface 820 also includes a movable, raised object or decoration 824, which takes the form of a mountain in this example, and the object 824 is placed on the base surface 822 and is at a smaller depth or distance from the projector/depth sensing mechanism. The projection surface 820 further includes a recessed surface 826 that is at a depth greater than the base surface 822 (farther away from the projector/depth sensing mechanism), and the recessed surface and sides of the cake 740 may be defined by edges 827.

In the illustrated example, the augmentation video projected by the projector provides a projected image that includes a base image 830 (shown as grass blowing in the wind) on the base surface 822, and a boundary or frame image 832 is provided about each section of the base image 830 adjacent edges 827 between the base surface 822 and recessed surfaces 826 or cake sides. The projected image also includes a recessed surface image 834 (shown as water that may be flowing in some cases) that is projected upon all recessed surfaces 826 or surfaces having a greater depth than the base surface 822.

The projected image further includes an object-specific image 838 that is projected upon the object 824, wherever the object 824 happens to be placed upon the base surface 822. In this example, the object 824 is a mountain and the image 838 includes a rocky base with a snowy peak, but in other cases the object-specific image 838 may take many other forms suited to the particular object (such as a tree, a character/figurine, and so on). If the object 824 is moved to another location on the base surface 822, the depth sensing mechanism 730 will provide data to the computer/controller 710 that is processed to determine a new/existing topography of the surface 820 including a location of the object 824. The computer and its hardware/software act to dynamically render the augmentation video to update the projected image, which in this case would result in the object-specific image 838 still being projected upon the object 824 but a change in the base image 830 and, in some locations of object 824, a change in the boundary/framing image 832 (as the grass or other base image would be projected onto the old/prior location of the object 824 but not on the new location).

Figure 9:
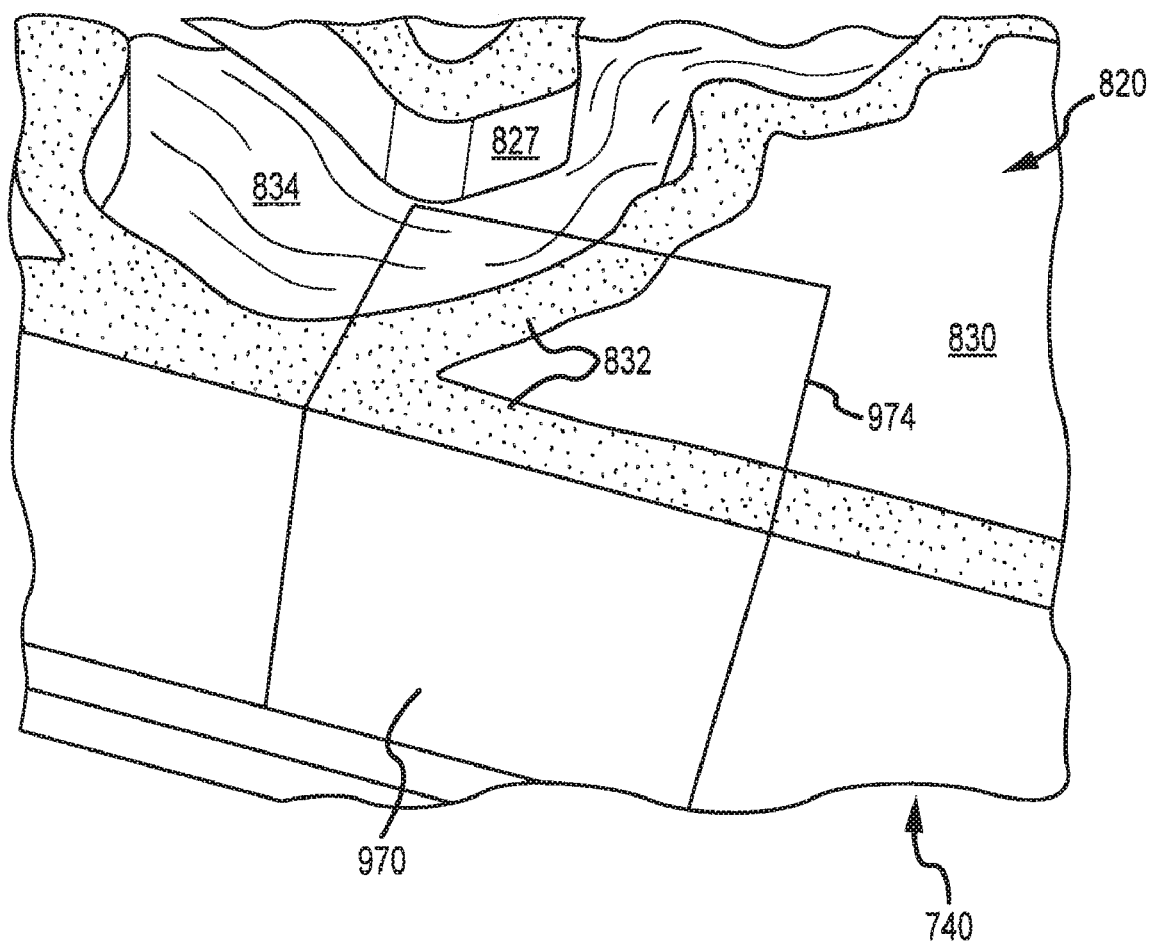
Figure 10:
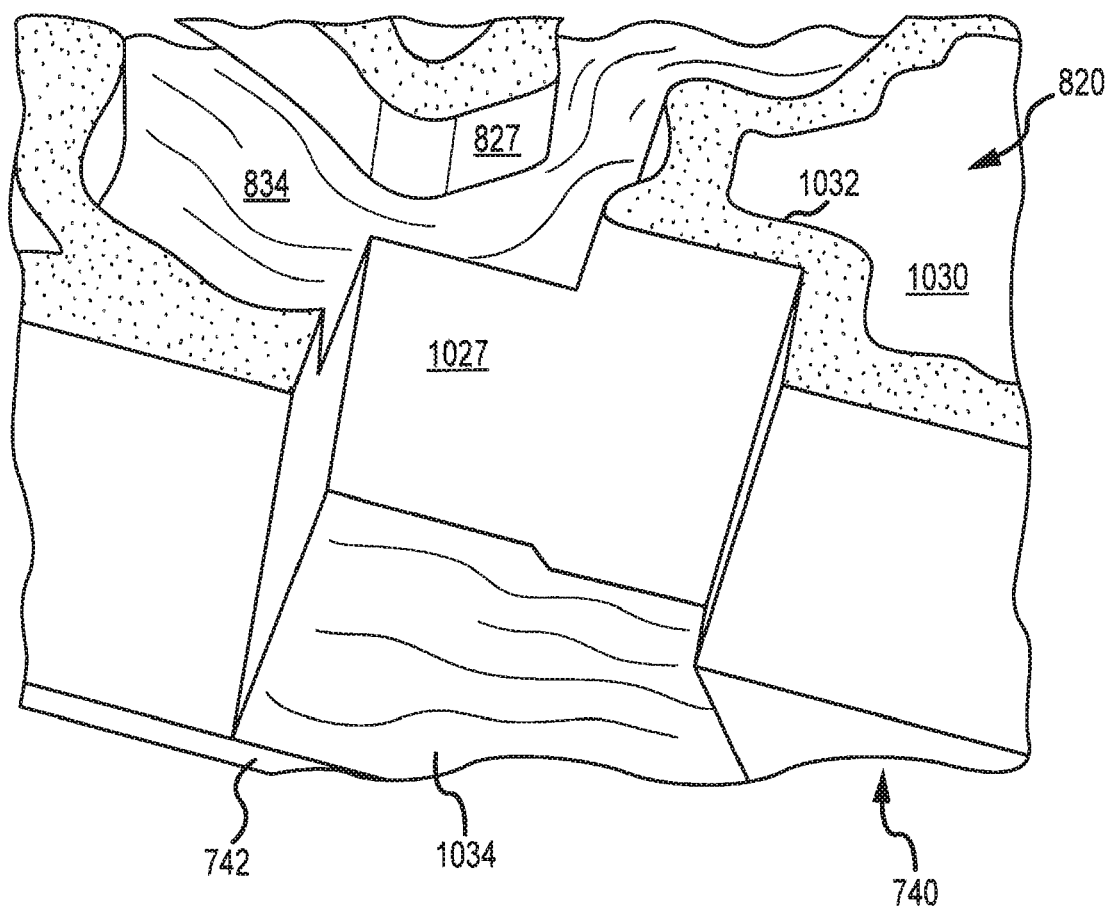

During operation of the system 700, the projected image is updated whenever a change in topography occurs and is detected by operation of the depth sensing mechanism 730 and computer 710 and its topography determination programs/modules. FIG. 9 illustrates the cake 740 as a piece 970 is being cut. The edges or cut lines 974 are forming a rectangle that extends through the base image 830, the framing/boundary image 832, and the recessed surface image 834. In FIG. 10, the food product or cake 740 is shown after the cut piece 970 has been removed to expose new side portions 1027 and a portion of the cake pan 742.

FIG. 10 illustrates the cake 740 after the depth sensing mechanism 730 and computer 710 have functioned to determine the new or current topography of the cake 740, have rendered or generated a new augmentation video, and the video is being projected by the projector 720 as the projected image. The updated or dynamically generated projected image or media includes a base image 1030 with a new shape as the removed piece 970 previously had included some of the base image 830. The projected image also includes a recreated framing or boundary image 1032 that is adjacent new sides/edges 1027 or between the base image 1030 and the sides/drop off 1027. Further, the projected image includes an additional recessed surface portion 1034 that extends the recessed surface image 834 onto the exposed surfaces of the pan 742, e.g., to show the river/water in all recessed surfaces similar to the true interactivity that is expected to occur with water. If the piece 970 is replaced, the projected image would be updated to return to the original projection surface topography and appear as shown in FIG. 8. In this manner, the food product 740 in system 700 provides an interactive experience with the projected image providing digital enhancement or augmentation by altering the look of the projection surfaces.

Figure 11:
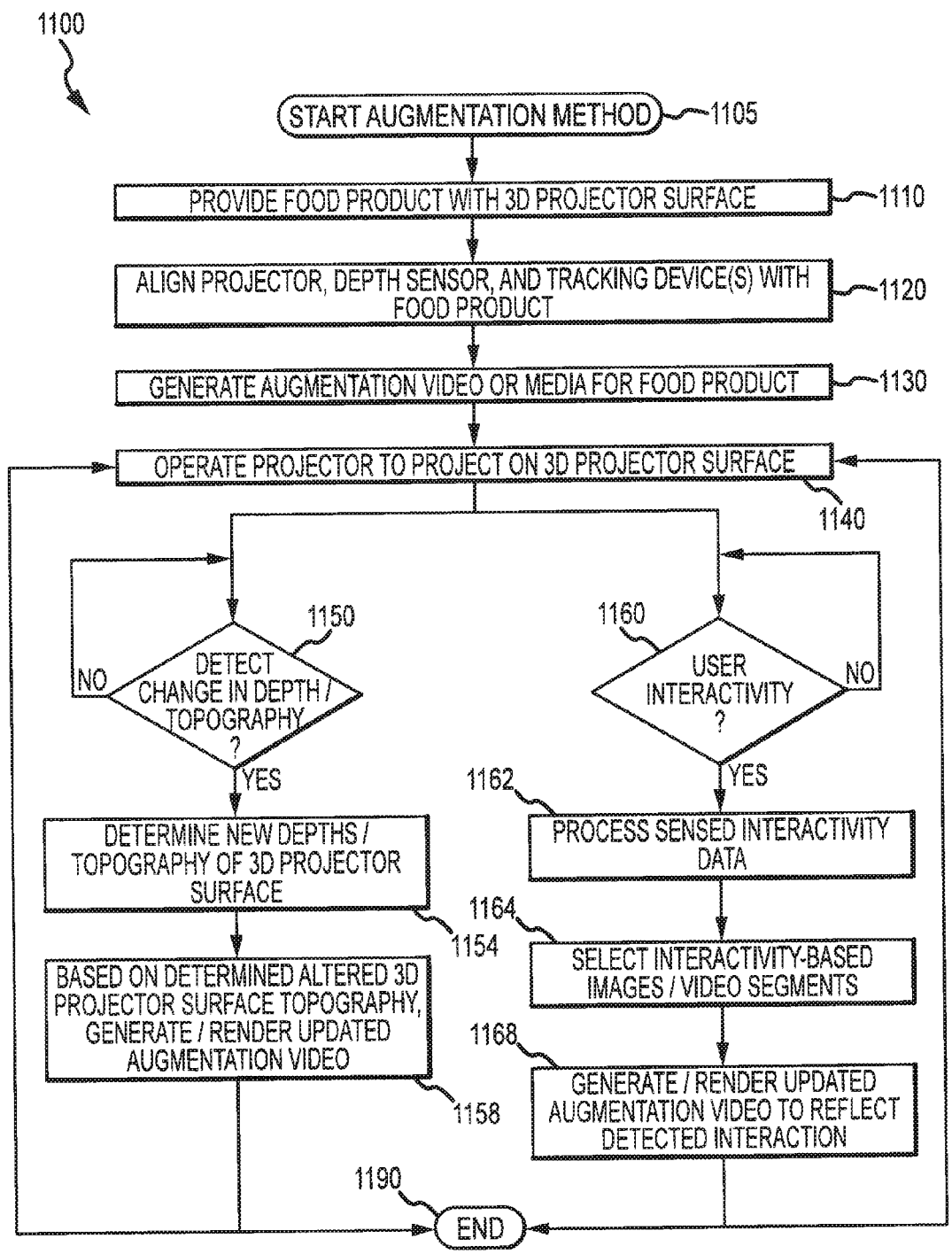
FIG. 11 is a flow diagram or chart showing a digital augmentation method that may be implemented by the system shown in FIGS. 7-10 to dynamically render or generate an augmentation video or projected image stream based on sensed changes in the depth(s) of a 3D projector surface and/or based on sensed user interactions with the food product or the 3D projector surface of the food product.

FIG. 11 illustrates an implementation of a food product augmentation method 1100 that may be implemented using the techniques and systems described herein such as by operation of the system 600. The method 1100 starts at 1105 such as with providing a computer/controller with a video generator for rendering an augmentation video in real time in response to determined changes in projection surface topography and/or in response to tracked/detected user interactivity on or near the projection surface of the food product. Also, in step 1105, a particular food product may be selected and its surface(s) designed (at least base or original shapes/designs). Step 1105 typically will also involve selecting the techniques to be used for determining the topography of the food product and for tracking interactivity as well as which projector to use in the augmentation system. Once these decisions are made, the computer may be loaded with the appropriate depth/distance processing software/hardware for determining topography and the appropriate tracking data processing software/hardware for tracking movement of the user and/or utensils they may position near the projection surface. The projector, interactivity tracking mechanism(s), and depth sensing mechanism(s) then may be positioned above or nearby a support location for a food product (e.g., to align these devices with the projection surface of the food product or later positioned food product).

At step 1110, the method 1100 continues with providing a food product with a 3D projector surface on the support. In step 1120, the projector, depth sensor, and tracing device(s) are aligned properly with the food product (e.g., with the center of the projector surface aligned with a projection lens of the projector and with its base surfaces a predefined distance or depth from the projector and sensing/tracking devices). At 1130, the method 1100 continues with generating an augmentation video or media for the selected food product 1130, and this may be generated using any of the techniques described above such as via online/networked interaction with a client, via an onsite decorating process, and the like. At 1140, the projector is operated by the controller to project the augmentation video on the 3D projector surface of the food product as a projected image.

At this point, the method 1100 may include the concurrently (or selectively) operating to track changes in the projector surface topography or shape and to track user interactivity. Regarding surface topography, the method 1100 includes at 1150 detecting a change in the depth between the projector and the projector surface of the food product (e.g., detecting a change in the surface topography or contours), and this may include using a depth sensing camera and associated software to determine the present contours of the projector surface. If no change is detected, the method 1100 continues at 1150, but, when a change is detected, the method 1100 continues at 1154 with determining new depths/topography of the 3D projector surface such as by the computer running a depth processor module to process the data from the depth sensing mechanism to map the shape of the projector surface. Then, at 1158, the method 1100 continues with generating/rendering an updated augmentation video/media based on the determined, altered 3D projector surface for the food product (such as by operating one or more video generator modules to render new animation showing an added recessed surface, movement of a raised object/decoration, and so on). The method 1100 then continues at 1140 with operating the projector to project the updated or newly rendered augmentation video upon the altered food product surface as projected images/media, or the process 1100 may end at 1190.

Alternatively or concurrently, the method 1100 may include detecting or sensing user interactivity at 1160 such as by using an interactivity tracking mechanism to detect movement of a knife, wand, or other utensil proximate to the projection surface using optical, magnetic, or other trackers or tracking techniques. If no interactivity occurs, the method 1100 continues at 1160, but when interactivity is detected, the method 1100 continues at 1162 with processing of the sensed interactivity data, which may involve the computer running a tracking processor module(s) to process IR reflections from retroreflective material or other motion/device tracking techniques. At 1164, the method 1100 continues with optionally selecting one or more interactivity-based images and/or videos based on the determined interactivity. For example, the video generator may be configured to respond to a tracked movement of a utensil such as a wand with adding images of fairy dust to the augmentation video along the tracked path while in other cases use of a knife near the projection surface may cause selection of other images/videos such as a video of released characters from the inside of a cake. At 1168, the method 1100 continues with the video generator being run or used by the computer/controller to generate or render an updated/modified augmentation video to be responsive to identified/tracked interactivity by the user with or near the 3D projection surface. The method 1100 may end at 1190 or continues at 1140 with the projector being operated by the computer/controller to output the dynamically created augmentation video so as to update the projected image, whereby the user can readily see the results of their interaction with the projected image/food product.

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention. For example, it may be useful to modify the surface of the food product to achieve a desired projection or enhancement result in response to the projected images/media. This may involve selecting the colors and make up of frostings and other materials applied to the 3D projection surface to achieve a desired result such as to achieve a particular gain (e.g., achieve a gain of 1 to 1.5 or the like), and the gain may be varied on the projection surface to provide desired results.

Further, some of the figures illustrated various hardware, software, and/or firmware components such as those found in the internal systems within the augmentation devices as separate pieces or modules. It will be understood that these modules or components may be combined in a variety of ways such as an augmentation software package with the separately shown pieces being features or feature sets of the one or more packages.

Some augmentation systems may utilize automatic projector/camera alignment techniques. Also, the augmentation systems may utilize more than one projector (e.g., be multi-projector systems to provide augmentation or projected images/media) and such systems may utilize hardware/software devices and/or controllers to provide synchronization of the multiple projectors to achieve a synchronized or desired projected image/media on a projection surface of a food product. Further, materials may be selected specifically to achieve a desired gain (e.g., the frosting of a cake, materials of a decoration, and so on), and it may also be useful to configure the food product and its projection surface to provide superimposed dynamic range (SDR) aspect.

We claim:

1. A method for augmenting a food product, comprising:
   providing the food product including a projection surface;
   generating an augmentation media file based on the projection surface;
   aligning a projector with the projection surface;
   providing a media file presentation including at least operating the projector to use the augmentation media file to project a projected image on the projection surface, wherein the projection surface has a three-dimensional (3D) topography and wherein the generating of the augmentation media file comprises mapping the projected image to the 3D topography;
   determining a modification of the 3D topography of the projection surface; and
   based on the determined modification of the 3D topography, altering at least one aspect of the media file presentation.

2. The method of claim 1, wherein the generating of the augmentation media file comprises combining a set of overlay images and a set of user-selected images to generate a composite digital video file to provide as input to the projector in the operating step and wherein at least a portion of the overlay images and a portion of the user-selected images are presented concurrently in the projected image.

3. The method of claim 2, wherein the generating of the augmentation media file is performed by a video generator run by a computer and comprises combining one or more digital data files associated with the overlay images and one or more digital data files associated with the user-selected images and wherein the user-selected images comprise still images or movies.

4. The method of claim 1, wherein the augmentation media file comprises audio or visual cues related to performing an interactive function with reference to the projection surface and wherein the projected image contains content corresponding to performance of the interactive function.

5. The method of claim 1, wherein the food product further comprises an ornament that is selectively movable in response to control signals and wherein the augmentation media file comprises the control signals and includes image segments mapped to the ornament during transmission of the control signals.

6. The method of claim 1, wherein the altering includes based on the determined modification of the 3D topography, generating a modified augmentation media file and operating the projector to use the modified augmentation media file to project a modified projected image on the projection surface.

7. The method of claim 1, wherein the projected image comprises differing sets of images mapped to differing portions of the projection surface based on a distance from the projector for the differing portions as determined from the 3D topography.

8. The method of claim 1, further comprising detecting a user interaction with the projection surface and, in response, generating a modified augmentation media file and operating the projector to use the modified augmentation media file to project a modified projected image on the projection surface.

9. The method of claim 8, wherein the modified augmentation media file includes an image set selected based on a utensil used in the user interaction.

10. A video projection assembly for enhancing a 3D projection surface of a food product, comprising:
    a controller including memory storing an augmentation video comprising images each mapped to portions of the 3D projection surface;
    a projector operable by the controller to project the augmentation video upon the 3D projection surface as a projected image; and
    a video generator running on the controller and acting to generate the augmentation video based on interaction data for the 3D projection surface, whereby the projected image is modified dynamically in response to user interactivity with the food product,
    wherein the interaction data comprises information defining a topology of the 3D projection surface and wherein the assembly comprises a depth sensing mechanism collecting data corresponding to a distance between the projector and the 3D projection surface and further comprises a depth processor run by the controller to process the distance data to generate the topology defining information for use by the video generator.

11. The assembly of claim 10, further comprising an interactivity tracking mechanism and the interaction data comprises tracked user or utensil motion proximate to the 3D projection surface determined based on tracking data collected by the interactivity mechanism.

12. The assembly of claim 10, wherein the portions of the 3D projection surface comprise a base surface, a recessed surface, and a raised-object surface and wherein the images mapped to the base, recessed, and raised-object surface differ from one another.

13. A system for digitally augmenting a cake, comprising:
a digital projector for projecting a projected image onto a surface of the cake;
a computer with a processor running a video generator and managing memory storing an augmentation media file, wherein the computer operates the digital projector to output the projected image using the augmentation media file; and
an interactivity detection mechanism collecting interaction data for the cake surface, wherein the computer operates the video generator to generate the augmentation media file based on the interaction data causing dynamic updating of the projected image,
wherein the augmentation media file comprises object-specific images,
wherein the interactivity detection mechanism tracks movement of an object associated with one of the object-specific images from a first location to a second location on the cake surface, and
wherein the video generator generates the augmentation media file such that the one of the object-specific images is displayed at the second location in the updated projected image.

14. The system of claim 13, wherein the interactivity detection mechanism comprises a depth sensing mechanism and depth processing software that is run by the computer to determine a topology of the cake surface based on the collected interaction data.

15. The system of claim 13, wherein the interactivity detection mechanism comprises a motion tracking mechanism detecting motion of a user or a utensil proximate to the cake surface and further comprises tracking data processing software run by the computer to determine user interaction with the cake surface.

16. The system of claim 15, the dynamic updating of the projected image includes inserting images associated with the determined user interaction in the augmentation media file.

* * * * *